Patented Nov. 16, 1937

2,099,357

UNITED STATES PATENT OFFICE 2,099,357

HALIDE ESTERS OF POLYUNSATURATED ALCOHOLS AND PROCESS OF PREPARING SAME

James H. Werntz, Wilmington, Del., assignor to E. I. du Pont de Nemours & Company, Wilmington, Del., a corporation of Delaware No Drawing. Application July 22, 1936, Serial No. 92,017

11 Claims. (Cl. 260—162)

This invention relates to new chemical compounds, more particularly to high molecular weight unsaturated halides, and still more particularly to aliphatic straight chain primary halides of at least twelve carbon atoms having at least two double bonds.

This case is a continuation in part of my copending application, Serial No. 35,972, filed August 13, 1935, which is in turn a continuation in part of application Serial No. 757,465, filed December 14, 1934.

While high molecular weight open chain halides containing one double bond are known, those containing a plurality of unsaturated linkages have hitherto been unknown.

This invention has as an object the preparation of high molecular weight aliphatic compounds containing two or more unsaturated groups and one reactive halogen. A still further object is the preparation of a hydrogen halide ester of a highly unsaturated alcohol obtained from a drying oil. A still further object of this invention is the preparation of useful intermediates for conversion to other derivatives of highly unsaturated alcohols.

These objects are accomplished by the following invention wherein a polyunsaturated alcohol of high molecular weight, i. e. of at least twelve and preferably fourteen carbon atoms is reacted with a phosphorus trihalide, such as phosphorus tribromide, the product being preferably extracted with benzene or a similar aromatic hydrocarbon. In an alternative process, the polyunsaturated alcohol is treated with a slight excess of the molar equivalent of thionyl chloride or bromide and heated on the water bath to remove sulfur dioxide and hydrogen chloride or bromide. If desired, the polyunsaturated halide may further be purified by distillation under reduced pressure.

Having outlined the general procedure, the following exemplifications thereof are added illustratively but not in limitation.

*Example I.—Bromide of China-wood oil alcohol*

The mixture of highly unsaturated alcohols obtained by the sodium reduction of China-wood oil is a viscous liquid which boiled 170–185° C. at 1 to 2 mm. The oil has an iodine number of 166, a refractive index of 1.4734, and a density of 0.8590. Two hundred sixty-five parts by weight of this highly unsaturated alcohol mixture was placed in a flask with a stirrer and chilled to −5° C. One hundred and ten parts by weight of phosphorus tribromide was then slowly added, the temperature being held at 0° C. The reaction mixture was stirred two hours at room temperature and finally one hour at 100° C. Benzene was then added and the solution washed with salt water until neutral. Evaporation of the benzene left 300 parts by weight of a brown oil, which had a bromine content by analysis of 26%. The bromide distilled 176–200° C. at 9 mm. The straw colored oil was slightly heavier than water.

The highly unsaturated bromide was reacted with sodium hydrosulfide in boiling alcohol to form the corresponding mercaptan and with sodium thiocyanate in boiling alcohol to form the corresponding thiocyanate.

*Example II.—Chloride of China-wood oil alcohol*

One hundred thirty-five parts by weight of the China-wood oil alcohol described in Example I was stirred with 71.4 parts by weight of thionyl chloride in a 500 cc. flask. Hydrogen chloride was evolved. The reaction mixture was heated on the steam bath with stirring to drive off hydrogen chloride, sulfur dioxide, and excess thionyl chloride. Fifty-six parts by weight of pyridine was then added from a dropping funnel and the reaction mixture was heated at 100° C. for four hours. The oil was diluted with 50 parts by volume of benzene and washed with hot water until neutral. The brown oil was distilled and the chloride of China-wood oil alcohol collected as a pale yellow oil.

The China-wood oil alcohol employed in the above examples was prepared according to the process of Scott and Hansley, U. S. Patent No. 2,019,022 as follows:

*Example III*

China-wood oil 407 parts, and 412 parts of tertiary butyl alcohol were dissolved in 1300 parts of xylene and the mixture added in about three hours to a stirred suspension of 256 parts of finely divided sodium in another 1300 parts of xylene at 100–110° C. The ratio of ester to sodium to hydrolyzing alcohol was made 1:6:4 instead of 1:4:2, since one of the conjugated double bonds is reduced along with the eleostearic acid ester group giving an alcohol isomeric with linoleyl alcohol. The yield of this alcohol was 91.8% of theory. The iodine number (method of Ber. 59B, 1390–7 (1926)) of the China-wood oil was 230–235. The higher alcohol produced had an iodine number of 166. The calculated value, assuming the unsaturation to be ⅓ reduced, would be 165.

For conversion to the halides, the crude reaction product obtained by treating China-wood oil with sodium may be used or the crude product may be subject to vacuum distillation and various unsaturated fractions thereof may be converted to halides. When the crude reaction product from the sodium reduction of China-wood oil is employed and converted to halides, the product is a mixture of unsaturated halides containing two double bonds, possibly some containing one double bond, and some containing three double bonds, together with a small amount of saturated halides, but is predominantly perhaps up to 90%, an individual polyunsaturated alcohol.

In general the polyunsaturated long chain alcohols having at least twelve carbon atoms which may be prepared according to the process of Scott and Hansley, U. S. Patent No. 2,019,022 may be employed in the process of the present invention to make the novel products of the invention. While the use of the crude reduction products or even the partially fractionated products in general results in a mixture of halides, it is possible to obtain an essentially pure polyunsaturated long chain halide by the proper selection of the initial material. Thus by reducing pure α or β eleostearin an essentially unitary octadecadienyl alcohol is obtained from which a substantially unitary octadecadienyl chloride, bromide or iodide is obtained. Similarly, pure polyunsaturated alcohols may be prepared by reducing, with sodium and alcohol according to the Scott and Hansley process, appropriate esters, e. g. methyl α eleostearate, methyl β eleostearate, ethyl jecorinate, methyl farnesate, methyl geranylacetate, ethyl α α dimethylgeranate, methyl citrylideneacetate, methyl clupanodonate, etc., which esters may be prepared by the methods described therefor in the literature. Linolic, linolenic, hirdgonic, arachidonic, therapinic, and similar acids may similarly be esterified with methyl or ethyl alcohol and the resulting ester reduced with sodium to the polyunsaturated long chain alcohol which may then be converted to the halide by the process of the present invention. From these alcohols the corresponding hexadecadienyl, dodecadionyl, octadecadienyl, pentadecadienyl halides may be prepared by the process of the present invention. There may thus be obtained octadecadienyl, pentadecadienyl, etc. chlorides, bromides, iodides and fluorides.

The process of the present invention is thus generically applicable to the preparation of and the invention includes generically in its scope the halides of long chain polyunsaturated alcohols, i. e. alcohols having at least two unsaturated preferably ethylenic linkages and having at least twelve carbon atoms, but preferably at least fourteen carbon atoms, including such alcohols as linoleyl, alpha- and beta-eleostearyl, tetradecadienyl, pentadecadienyl, octadecatrienyl, hexadecadienyl and the like. Those alcohols corresponding in chain lengths to the acids which are major constituents of drying and semi-drying oils, the alcohol differing from the acid in having a carbinol group in place of the carboxyl group, e. g. alcohols of at least eighteen carbon atoms are a particularly preferred class of alcohols and are obtainable by the carboxyl reduction of polyunsaturated fatty acid radicals occurring to a substantial amount, that is at least 10%, in drying and semi-drying oils. They include therefore the polyunsaturated alcohols obtained by the carboxylic reduction of drying oils or drying oil acids such as linseed oil, China-wood oil, perilla oil, soya bean oil and the fatty acids derived from their saponification, such as linolic acid, eleostearic acid, linolenic acid etc. Further, the halides of the present invention include those of polyunsaturated alcohols obtainable by sodium reduction of the marine animal oils which are rich in the glycerides of highly unsaturated acids, examples of such oils being herring oil, sardine oil, menhaden oil and shark oil. In the claims the term "polyunsaturated alcohol mixture obtainable by reduction of China-wood oil" or similar phrases wherein the oil is specified as a drying or at least a semi-drying oil refers to the mixture of alcohols obtainable by the carboxyl reduction of the oil by the method specified. Since such oils contain in major amount polyunsaturated acid radicals which are converted to polyunsaturated alcohols, the alcoholic mixture contains major amounts of polyunsaturated alcohols along with minor amounts of saturated alcohols and monounsaturated alcohols.

Any mixture of the various drying and semi-drying vegetable and marine animal oils, or any individual oil may be reduced with sodium and the product subjected to fractional distillation. Any fraction which contains a substantial amount, that is, at least 10% of alcohols containing at least two unsaturated ethylenic bonds will be suitable for conversion to the highly unsaturated halides.

As a further example of a mixture of alcohols suitable for use in the process of the present invention, there may be used the mixture of alcohols produced as follows:

*Example IV*

Cottonseed oil, 450 parts and 244 parts of tertiary butyl alcohol were dissolved in 1300 parts of xylene and slowly added in the course of two and one-half hours to a stirred suspension of 152 parts of finely divided sodium in another 1300 parts of xylene at 100–110° C. Yield of higher alcohols, 90.4%. Iodine number of higher alcohol mixture, 123 (gms. I₂ per 100 gms. alcohol). Iodine number of original cottonseed oil 110. Calculated iodine value for mixture of alcohols, 122.

In Example I, the China-wood oil alcohol was converted to the bromide by reaction with phosphorous tribromide. In place of phosphorous tribromide, phosphorous trichloride, phosphorous triiodide or phosphorous trifluoride may be employed. The resulting halides are all liquids and are valuable intermediates for conversion to other derivatives. Since phosphorous trifluoride is a gas at ordinary temperatures, it will be necessary to operate in a closed system when employing this reagent. On the other hand, phosphorous triiodide is a solid and in order to effect satisfactory reaction, it is preferable to employ it at temperatures above its melting point, i. e., 61° C. The bromide and the chloride are the preferred halides because of their greater stability and because the phosphorous tribromide and the phosphorous trichloride are more readily available, less costly, and more readily handled. The chlorides, bromides and iodides derived from the highly unsaturated alcohols are preferred to the fluorides because of the greater stability of the chlorides, bromides and iodides.

In place of thionyl chloride employed in Example II, thionyl bromide, SOBr₂, or thionyl fluoride, SOF₂ may be used. The fluorides may also be made by metathesis of an unsaturated chloride with a metallic fluoride, e. g. silver fluoride.

Pure linoleyl alcohol obtainable by the process disclosed by Bruson et al. Ind. Eng. Chem. 19, 1187-91 (1927) may be converted to the chloride, bromide, iodide or fluoride. It is, however, in general more convenient to use a less pure linoleyl alcohol as shown in the following example:

*Example V.—Chloride of linseed oil alcohol*

Linseed oil dissolved in a mixture of xylene and tertiary butyl alcohol was subjected to sodium reduction and the resulting viscous liquid was washed with water and then distilled under reduced pressure. A fraction which boiled at 170–190° C. at about 2 mm. was collected. The pale yellow colored oil had an iodine number of 195. Pure linoleyl alcohol has an iodine number of 191. One hundred and thirty-three parts by weight of this linseed oil alcohol was stirred with 71.4 parts by weight of thionyl chloride in a reaction vessel. Hydrogen chloride was evolved. The reaction mixture was heated on the steam bath with stirring to drive off hydrogen chloride, sulfur dioxide and excess thionyl chloride. The oil was diluted with 50 parts by volume of benzene and washed with hot water until neutral. The brown oil was distilled under reduced pressure and the chloride of linseed oil alcohol was collected as a pale yellow oil.

Polyunsaturated alcohols of up to twenty-two carbon atoms may be prepared by the process of the Scott and Hansley patent and therefrom halides may be prepared by the process of the present invention as in the following example:

*Example VI.—Chlorides of menhaden oil alcohols*

Menhaden oil was subjected to sodium reduction and the resulting viscous liquid was washed with water. The alcohols were then converted to the corresponding chlorides by treatment with thionyl chloride as described in Example 5. The brown oil which was obtained was not distilled and was a mixture of the chlorides of various saturated, unsaturated and polysaturated alcohols ranging from 14 to 22 carbon atoms.

This invention relates to the halides of the long chain alcohols containing two or more double bonds and having at least twelve and preferably fourteen carbon atoms and preferably to aliphatic straight chain primary halides having at least two double bonds and a chain length equal to that of a fatty acid present in substantial amounts in combined form in a drying oil. Of particular importance is the mixture of halides obtained from drying oil alcohols such as are obtained by sodium reduction of China-wood oil, linseed oil, soya bean oil, and perilla oil, etc. As raw materials for halide formation, there may also be employed the alcohols obtained by sodium reduction of herring oil, sardine oil, shark oil, almond oil, laurel oil, corn oil, cottonseed oil, sunflower oil, hempseed oil, poppy seed oil, safflower oil, lumbang oil, etc.

The unsaturated halides of this invention because of their high solubility in oils are particularly useful as assistants for extreme pressure lubricants. They are also useful for conversion to mercaptans by reaction with sodium hydrosulfide in alcohol or to sulfides by reaction with sodium sulfide in alcohol or by reaction with sodium thiocyanate in alcohol to form the highly unsaturated thiocyanates of interest as parasiticides.

The highly unsaturated character of these compounds renders them more soluble in organic solvents such as alcohol, benzene, lubricating oils, etc. than the corresponding less saturated halides of the prior art. Furthermore, the high degree of unsaturation tends to lower the melting point so that these highly unsaturated halides are more liquid in nature than the unsaturated halides such as oleyl bromide of the prior art. Another feature of the highly unsaturated halides is the fact that on sulfation the products are more water soluble than the sulfates of the less unsaturated halides and these sulfated halogen compounds are more readily emulsified in water. Solubility in water is a very important property, particularly when the derivatives of the highly unsaturated halides such as the mercaptans and thiocyanates are to be used as corrosion inhibitors, pharmaceuticals, flotation agents or parasiticides.

The above description and examples are intended to be illustrative only. Any modification of or variation therefrom which conforms to the spirit of the invention is intended to be included within the scope of the claims.

I claim:

1. Process of preparing a polyunsaturated halide which comprises reacting 265 parts by weight of a polyunsaturated alcohol mixture having an iodine number of 166 obtained from China-wood oil by sodium reduction, with 110 parts by weight of phosphorous tribromide at approximately 0° C. for two hours and at 100° C. for one hour, dissolving the reaction product in benzene, washing the benzene solution with salt water until neutral and isolating the polyunsaturated halide by evaporating the benzene.

2. Process of preparing a polyunsaturated halide which comprises reacting a polyunsaturated alcohol mixture obtainable by reduction with sodium from China-wood oil with a phosphorous trihalide and separating the polyunsaturated halide.

3. Process of preparing a polyunsaturated halide which comprises reacting, with a phosphorous trihalide, a polyunsaturated alcohol mixture obtainable by sodium reduction from a drying oil.

4. The bromide ester of the polyunsaturated alcoholic mixture obtainable from China-wood oil by sodium reduction.

5. An octadecadienyl bromide.

6. The halide ester of the polyunsaturated alcoholic mixture obtainable by sodium reduction from an oil having at least semi-drying properties.

7. An octadecadienyl halide.

8. A halide of a polyunsaturated alcohol having at least two unsaturated linkages and at least fourteen carbon atoms.

9. A polyunsaturated halide product obtainable by reaction of a phosphorous trihalide with a polyunsaturated alcohol mixture which is in turn obtainable by sodium reduction of a natural glyceride having an iodine number of at least twenty.

10. A compound of the formula RX, wherein X is a halogen atom and R is a polyunsaturated open chain hydrocarbon radical of at least eighteen carbon atoms.

11. A polyunsaturated halide containing at least two unsaturated linkages and at least fourteen carbon atoms, the halogen atom being on a carbon having only single linkages.

JAMES H. WERNTZ.